US011961659B2

(12) United States Patent
Omura et al.

(10) Patent No.: US 11,961,659 B2
(45) Date of Patent: Apr. 16, 2024

(54) IRON CORE FOR TRANSFORMER

(71) Applicant: JFE STEEL CORPORATION, Tokyo (JP)

(72) Inventors: Takeshi Omura, Tokyo (JP); Hirotaka Inoue, Tokyo (JP); Seiji Okabe, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 700 days.

(21) Appl. No.: 17/042,182

(22) PCT Filed: Mar. 29, 2019

(86) PCT No.: PCT/JP2019/014271
§ 371 (c)(1),
(2) Date: Sep. 28, 2020

(87) PCT Pub. No.: WO2019/189857
PCT Pub. Date: Oct. 3, 2019

(65) Prior Publication Data

US 2021/0027939 A1 Jan. 28, 2021

(30) Foreign Application Priority Data

Mar. 30, 2018 (JP) ................................. 2018-069889

(51) Int. Cl.
*H01F 27/24* (2006.01)
*H01F 1/16* (2006.01)
(Continued)

(52) U.S. Cl.
CPC ............... *H01F 41/02* (2013.01); *H01F 1/16* (2013.01); *H01F 27/245* (2013.01); *H01F 3/02* (2013.01)

(58) Field of Classification Search
CPC .......... H01F 41/02; H01F 1/16; H01F 27/245; H01F 3/02; H01F 41/0233; H01F 27/24;
(Continued)

(56) References Cited

U.S. PATENT DOCUMENTS 5,261,971 A * 11/1993 Yoshitomi ............ C21D 8/1222 148/112
5,371,486 A 12/1994 Yamada et al.
(Continued)

FOREIGN PATENT DOCUMENTS

CN 104011231 A 8/2014
CN 104011246 A 8/2014
(Continued)

OTHER PUBLICATIONS

Apr. 23, 2019, International Search Report issued in the International Patent Application No. PCT/JP2019/014271.
(Continued)

*Primary Examiner* — Tuyen T Nguyen
(74) *Attorney, Agent, or Firm* — KENJA IP LAW PC

(57) ABSTRACT

Vibration of an iron core is reduced to reduce transformer noise. An iron core for a transformer comprises a plurality of grain-oriented electrical steel sheets stacked together, wherein at least one of the plurality of grain-oriented electrical steel sheets: (1) has a region in which closure domains are formed in a direction crossing a rolling direction and a region in which no closure domains are formed; and (2) has an area ratio R of 0.10% to 30%, the area ratio R being an area ratio, to the whole grain-oriented electrical steel sheet, of a region in which a shrinkage amount at a maximum displacement point when excited in the rolling direction at a maximum magnetic flux density of 1.7 T and a frequency of 50 Hz is at least $2\times10^{-7}$ less than a shrinkage amount in the region in which no closure domains are formed.

4 Claims, 10 Drawing Sheets

(51) Int. Cl.
*H01F 3/02* (2006.01)
*H01F 27/245* (2006.01)
*H01F 41/02* (2006.01)

(58) Field of Classification Search
CPC ....... H01F 27/32; C21D 10/00; C21D 8/1294; C21D 9/46; C21D 8/12; C22C 38/00
See application file for complete search history.

(56) References Cited

U.S. PATENT DOCUMENTS

| | | | | |
|---|---|---|---|---|
| 9,646,749 | B2 | 5/2017 | Suehiro et al. | |
| 9,984,800 | B2 | 5/2018 | Takajo et al. | |
| 10,395,806 | B2 | 8/2019 | Inoue et al. | |
| 10,465,259 | B2 | 11/2019 | Takajo et al. | |
| 10,745,773 | B2 | 8/2020 | Okabe et al. | |
| 2013/0206283 | A1 | 8/2013 | Inoue et al. | |
| 2014/0352849 | A1* | 12/2014 | Suehiro | C22C 38/06 148/306 |
| 2014/0360629 | A1 | 12/2014 | Inoue et al. | |
| 2015/0187474 | A1 | 7/2015 | Takajo et al. | |
| 2015/0241335 | A1 | 8/2015 | Ito et al. | |
| 2015/0310973 | A1 | 10/2015 | Takajo et al. | |
| 2016/0133368 | A1* | 5/2016 | Okabe | C22C 38/00 428/603 |
| 2017/0016085 | A1 | 1/2017 | Toda et al. | |
| 2017/0253940 | A1 | 9/2017 | Takajo et al. | |
| 2018/0037965 | A1 | 2/2018 | Takajo et al. | |
| 2020/0035392 | A1 | 1/2020 | Omura et al. | |
| 2021/0027939 | A1 | 1/2021 | Omura et al. | |

FOREIGN PATENT DOCUMENTS

| | | | |
|---|---|---|---|
| CN | 104024457 | A | 9/2014 |
| CN | 104093870 | A | 10/2014 |
| CN | 106029917 | A | 10/2016 |
| CN | 107250391 | A | 10/2017 |
| EP | 2799574 | A1 | 11/2014 |
| EP | 2799579 | A1 | 11/2014 |
| JP | S60114519 | A | 6/1985 |
| JP | H03204911 | A | 9/1991 |
| JP | H04116809 | A | 4/1992 |
| JP | 108269562 | A | 10/1996 |
| JP | 2002012918 | A | 1/2002 |
| JP | 2003034822 | A | 2/2003 |
| JP | 2003077747 | A | 3/2003 |
| JP | 4092791 | B2 * | 5/2008 |
| JP | 2012177149 | A | 9/2012 |
| JP | 2013087305 | A | 5/2013 |
| JP | 5429213 | B2 | 2/2014 |
| JP | 2015052144 | A | 3/2015 |
| JP | 2017128765 | A | 7/2017 |
| WO | 2012164702 | A1 | 12/2012 |

OTHER PUBLICATIONS

Sep. 29, 2022, Office Action issued by the Canadian Intellectual Property Office in the corresponding Canadian Patent Application No. 3,095,320.

Apr. 21, 2021, the Extended European Search Report issued by the European Patent Office in the corresponding European Patent Application No. 19775886.5.

Sep. 29, 2021, Office Action issued by the Canadian Intellectual Property Office in the corresponding Canadian Patent Application No. 3,095,320.

Feb. 7, 2024, Office Action issued by the China National Intellectual Property Administration in the corresponding Chinese Patent Application No. 201980021118.3 with English language search report.

* cited by examiner

IRON CORE FOR TRANSFORMER

TECHNICAL FIELD

The present disclosure relates to an iron core for a transformer obtained by stacking grain-oriented electrical steel sheets, and particularly relates to an iron core for a transformer that can reduce magnetostrictive vibration to suppress transformer noise.

BACKGROUND

Various techniques for reducing noise generated from transformers have been studied conventionally. In particular, iron cores are noise sources even in an unloaded state. Accordingly, a number of techniques for iron cores and grain-oriented electrical steel sheets used in iron cores have been developed to reduce noise.

Main causes of noise are magnetostriction of grain-oriented electrical steel sheets and resulting vibration of iron cores. Various techniques have therefore been proposed to suppress vibration of iron cores.

For example, JP 2013-087305 A (PTL 1) and JP 2012-177149 A (PTL 2) each propose a technique of suppressing vibration of an iron core by sandwiching a resin or a damping steel sheet between grain-oriented electrical steel sheets.

JP H03-204911 A (PTL 3) and JP H04-116809 A (PTL 4) each propose a technique of suppressing vibration of an iron core by stacking two types of steel sheets that differ in magnetostriction.

JP 2003-077747 A (PTL 5) proposes a technique of suppressing vibration of an iron core by adhering grain-oriented electrical steel sheets stacked together. JP H08-269562 A (PTL 6) proposes a technique of reducing magnetostrictive amplitude by causing small internal strain to remain in the whole steel sheet.

CITATION LIST

Patent Literatures

PTL 1: JP 2013-087305 A
PTL 2: JP 2012-177149 A
PTL 3: JP H03-204911 A
PTL 4: JP H04-116809 A
PTL 5: JP 2003-077747 A
PTL 6: JP H08-269562 A

SUMMARY

Technical Problem

The techniques described in PTL 1 to PTL 6 are considered to have certain effects in magnetostriction reduction or iron core vibration reduction, but have the following problems.

With the method of sandwiching a resin or a damping steel sheet between steel sheets as proposed in PTL 1 and PTL 2, the size of the iron core increases.

With the method of using two types of steel sheets as proposed in PTL 3 and PTL 4, the steel sheets used need to be accurately managed and stacked.

This makes the iron core production process complex, and decreases productivity.

With the method of adhering steel sheets to each other as proposed in PTL 5, the adhesion requires time. Besides, there is a possibility that non-uniform stress acts on the steel sheets and magnetic property degrades.

With the method proposed in PTL 6, the amplitude can be reduced, but the magnetostrictive waveform strain increases, leading to an increase of noise caused by magnetostrictive harmonic. Thus, the noise suppression effect is low.

It could therefore be helpful to reduce vibration of an iron core to reduce transformer noise by a mechanism different from conventional techniques.

Solution to Problem

As a result of careful examination, we newly discovered that, by providing two or more types of regions different in magnetostrictive property in a steel sheet, the magnetostrictive vibration of the whole iron core is suppressed by mutual interference, with it being possible to reduce transformer noise.

The present disclosure is based on these discoveries. We thus provide the following.

1. An iron core for a transformer, comprising a plurality of grain-oriented electrical steel sheets stacked together, wherein at least one of the plurality of grain-oriented electrical steel sheets: (1) has a region in which closure domains are formed in a direction crossing a rolling direction and a region in which no closure domains are formed; and (2) has an area ratio R of 0.10% to 30%, the area ratio R being an area ratio, to the whole grain-oriented electrical steel sheet, of a region in which a shrinkage amount at a maximum displacement point when excited in the rolling direction at a maximum magnetic flux density of 1.7 T and a frequency of 50 Hz is at least $2\times10^{-7}$ less than a shrinkage amount in the region in which no closure domains are formed.

2. The iron core for a transformer according to 1., wherein an angle of the closure domains with respect to the rolling direction is 60° to 90°.

3. The iron core for a transformer according to 1. or 2., wherein an interval between the closure domains in the rolling direction is 3 mm to 15 mm.

Advantageous Effect

It is thus possible to reduce vibration of an iron core to reduce transformer noise by a mechanism different from conventional techniques.

DETAILED DESCRIPTION

First, magnetostriction of a grain-oriented electrical steel sheet will be described below.

Figure 1:
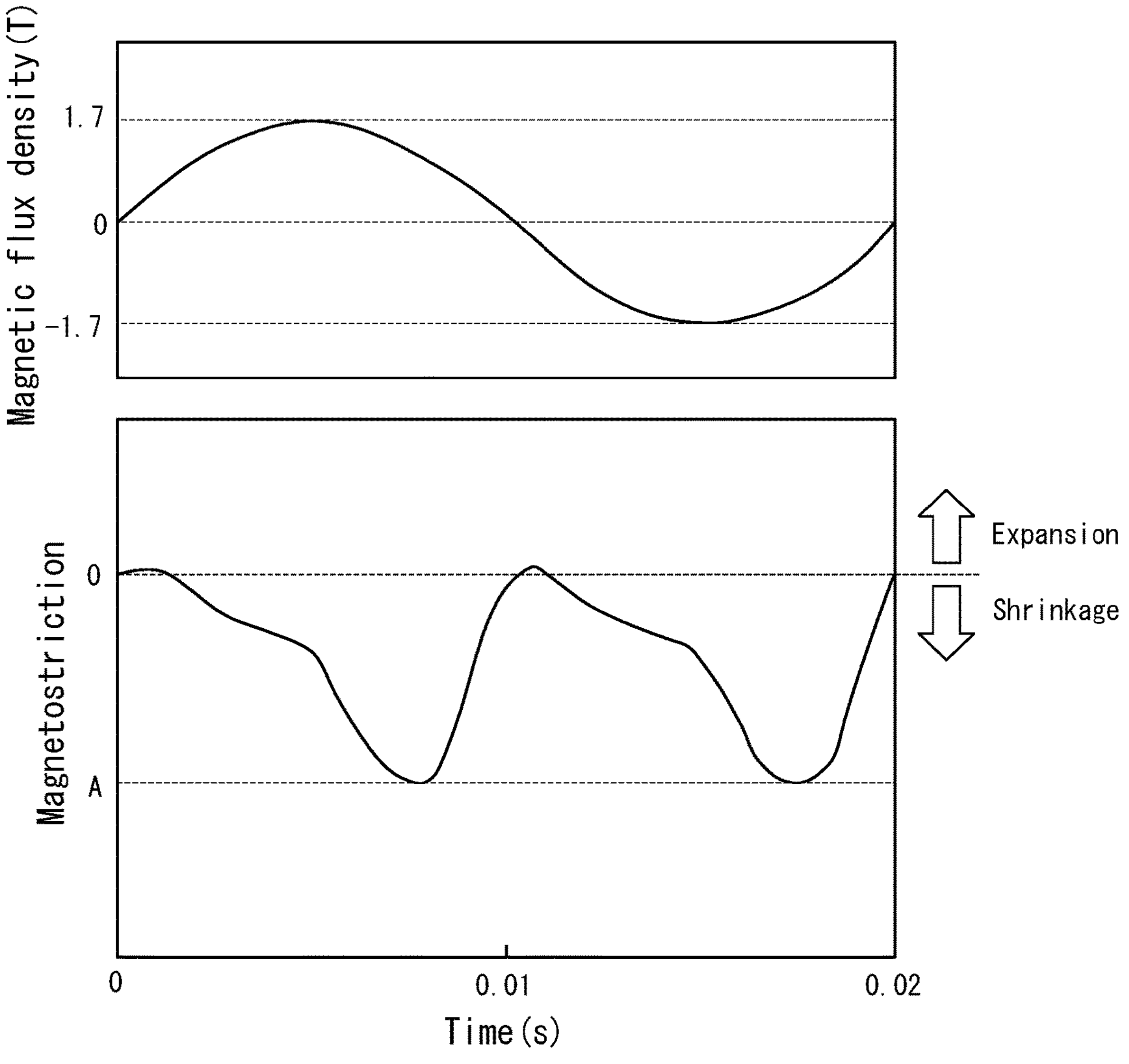
FIG. 1 is a graph illustrating an example of expansion and shrinkage behavior when a grain-oriented electrical steel sheet is excited under the conditions of a maximum magnetic flux density of 1.7 T and a frequency of 50 Hz.

FIG. 1 is a graph illustrating an example of the expansion and shrinkage behavior of a grain-oriented electrical steel sheet in a rolling direction when the grain-oriented electrical steel sheet is excited in the rolling direction under the conditions of a maximum magnetic flux density of 1.7 T and a frequency of 50 Hz.

The expansion and shrinkage behavior of a steel sheet is typically caused by an increase or decrease of magnetic domains called auxiliary magnetic domains that have components extending in a direction perpendicular to the steel sheet surface and have spontaneous magnetization directed in <100><010> direction. Accordingly, one possible method for reducing expansion and shrinkage in the rolling direction is to suppress the formation of auxiliary magnetic domains. The formation of auxiliary magnetic domains can be suppressed by reducing the deviation angle between the rolling direction and [001] axis. However, there is a limit to the reduction of the deviation angle.

In view of this, we studied another method to suppress the expansion and shrinkage of the whole iron core. Specifically, regions that differ in magnetostrictive property are formed in at least one of the grain-oriented electrical steel sheets constituting the iron core, to suppress the expansion and shrinkage of the whole iron core by mutual interference between the regions. As a means of controlling the magnetostrictive property, a method of forming closure domains in a direction crossing the rolling direction was used. Since closure domains expand in a direction orthogonal to the rolling direction, the formation and disappearance of closure domains cause changes, i.e. shrinkage and expansion, in the rolling direction.

Experiments conducted to study transformer noise reduction by this method will be described below.

<Experiment 1>

First, how closure domains introduced into a grain-oriented electrical steel sheet influence the noise of a transformer produced using the grain-oriented electrical steel sheet in an iron core was studied.

Figure 2:
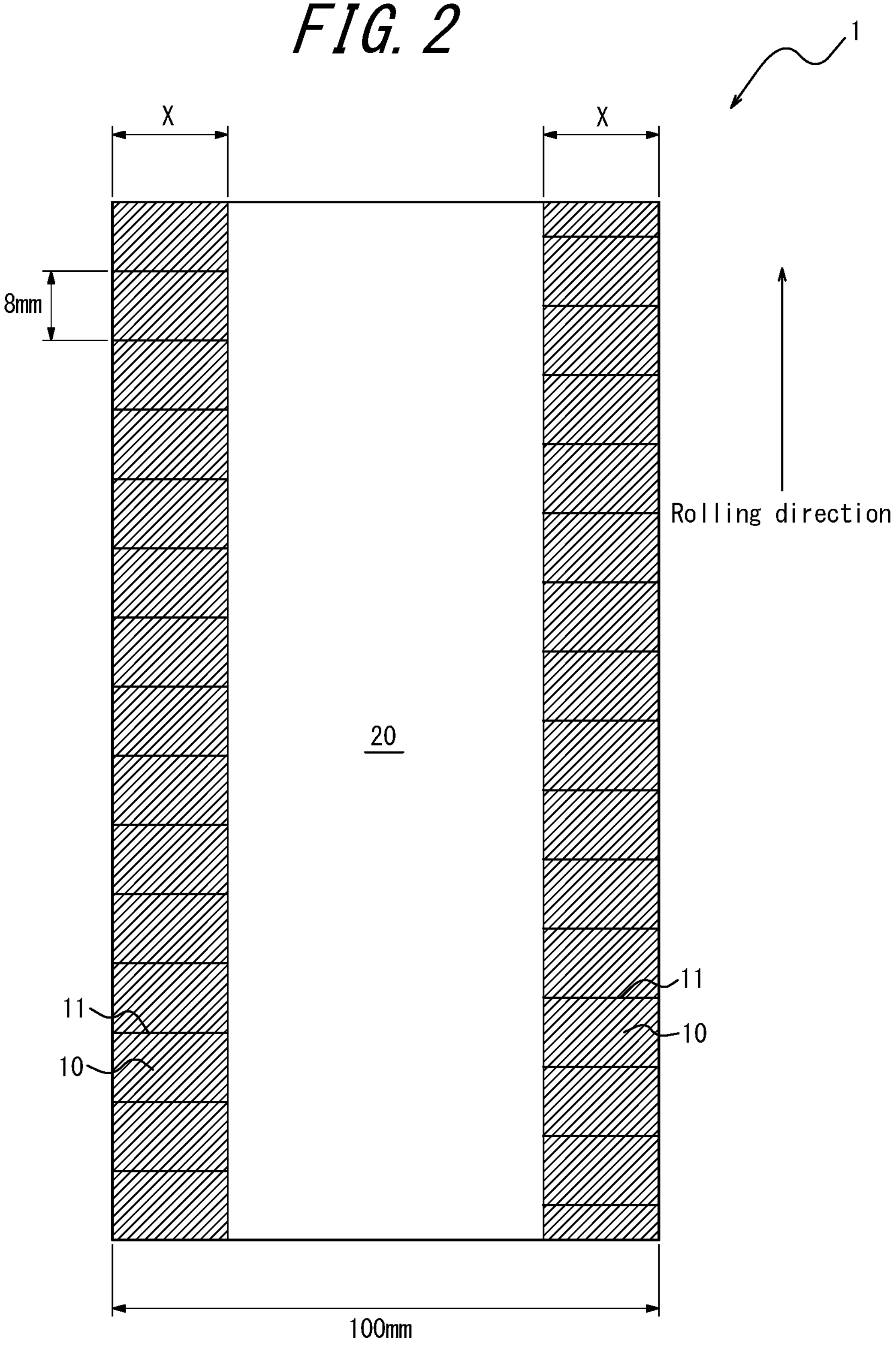
FIG. 2 is a schematic diagram of a grain-oriented electrical steel sheet as iron core material used in Experiment 1.

FIG. 2 schematically illustrates a grain-oriented electrical steel sheet 1 used as iron core material and arrangement of closure domains provided in the grain-oriented electrical steel sheet. A strip-shaped closure domain formation region 10 extending from one end to the other end in the rolling direction of the grain-oriented electrical steel sheet 1 was formed in both end parts of the grain-oriented electrical steel sheet 1 in the width direction (direction orthogonal to the rolling direction). The region between the two closure domain formation regions 10 was a region (closure domain non-formation region) 20 having no closure domains formed therein.

The grain-oriented electrical steel sheet 1 as iron core material for a transformer was produced by the following procedure. First, a typical grain-oriented electrical steel sheet having a thickness of 0.27 mm and not subjected to magnetic domain refining treatment was slit so as to have a width of 100 mm in the direction orthogonal to the rolling direction, and then subjected to a beveling work. When shearing the grain-oriented electrical steel sheet to have bevel edges, the steel sheet surface was irradiated with a laser on the shearing line entry side, to form the closure domain formation region 10. The laser was applied while being linearly scanned in the direction orthogonal to the rolling direction, as illustrated in FIG. 2. The laser irradiation was performed at an interval (irradiation line interval) of 8 mm in the rolling direction. As a result of the laser irradiation, linear strain 11 was formed at each position irradiated with the laser.

The other laser irradiation conditions were as follows:

laser: Q-switched pulse laser power: 3.5 mJ/pulse pulse interval (pitch interval): 0.24 mm.

Herein, the pulse interval denotes the distance between the centers of adjacent irradiation points.

To investigate the influence on the magnetostrictive property, grain-oriented electrical steel sheets were produced with the width X of each individual region of the closure domain formation region 10 in the direction orthogonal to the rolling direction being varied in a range of 0 mm to 50 mm.

Through closure domain observation by the Bitter method using a magnetic viewer (MV-95 made by Sigma Hi-Chemical, Inc.), it was determined that closure domains were formed in the strain-introduced part as intended. That is, linearly extending closure domains were formed in the closure domain formation region 10. The angle of the closure domains with respect to the rolling direction was 90°, and the interval between the closure domains in the rolling direction was 8 mm.

After this, the obtained grain-oriented electrical steel sheets 1 were stacked to form an iron core, and the iron core was used to produce a transformer with a rated capacity of 1000 kVA. For each obtained transformer, noise when excited under the conditions of a maximum magnetic flux density of 1.7 T and a frequency of 50 Hz was evaluated.

Figure 3:
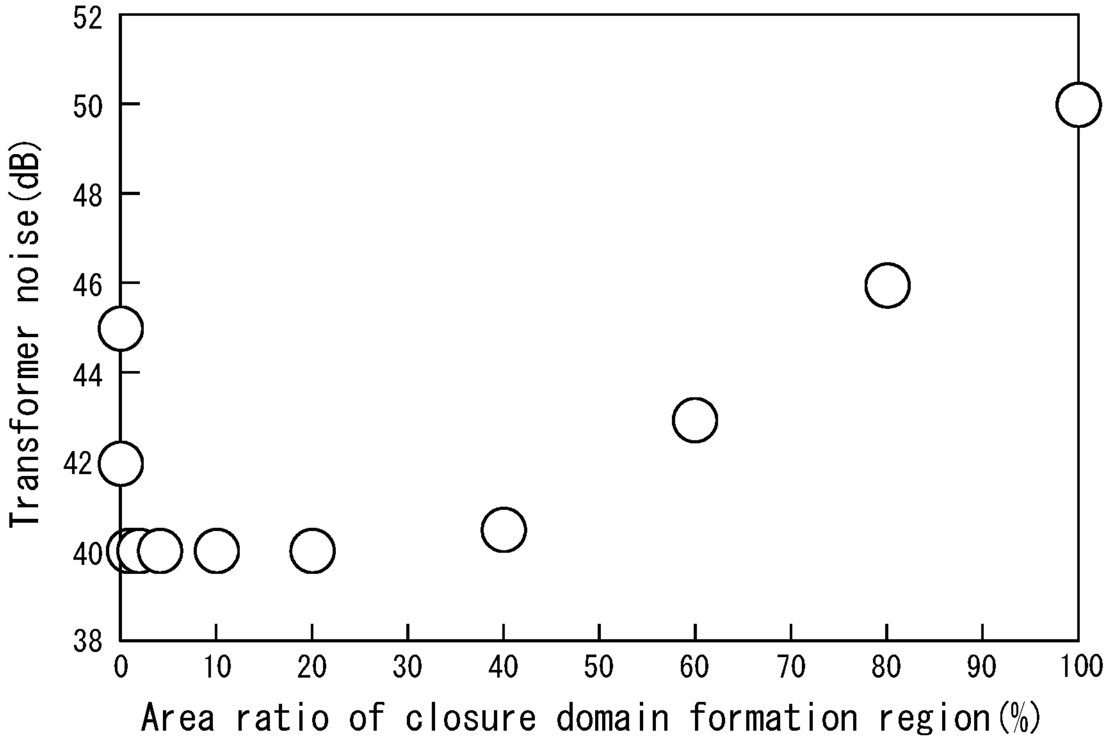
FIG. 3 is a graph illustrating the relationship between the area ratio (%) of a closure domain formation region and the transformer noise (dB) in Experiment 1.

FIG. 3 illustrates the relationship between the area ratio (%) of the closure domain formation region and the transformer noise (dB). Herein, the area ratio of the closure domain formation region denotes the ratio of the area of the closure domain formation region 10 to the area of the grain-oriented electrical steel sheet 1 used.

The results in FIG. 3 revealed that the transformer noise can be reduced by forming closure domains. The results in FIG. 3 also revealed that, if the area ratio of the closure domain formation region is greater than a specific value, the transformer noise increases to a level greater than in the case where no closure domains are introduced.

The reason why the transformer noise was reduced by introducing closure domains in a range in which the area ratio of the closure domain formation region was not greater than the specific value is considered to be as follows: In the region in which closure domains are formed, the formation and disappearance of closure domains and the disappearance and formation of auxiliary magnetic domains cause the expansion and shrinkage of the steel sheet. Meanwhile, in the region in which no closure domains are formed, only the disappearance and formation of auxiliary magnetic domains cause the expansion and shrinkage of the steel sheet. Thus, the expansion and shrinkage behavior differs between the closure domain formation region and the closure domain non-formation region. As a result of the regions different in expansion and shrinkage behavior being both present in one steel sheet, the two regions influence each other reciprocally. Consequently, the region with smaller shrinkage serves to reduce the shrinkage amount of the region with greater shrinkage, so that the overall shrinkage is suppressed and the noise is reduced. Providing the region having different expansion and shrinkage behavior even in a small area has the expansion and shrinkage suppression effect and contributes to reduced noise.

The reason why the transformer noise increases when the area ratio of the closure domain formation region is excessively high is considered to be as follows: By introducing closure domains, the shrinkage amount of the whole steel sheet is reduced and the noise caused by shrinkage is reduced. However, when strain is introduced excessively, the magnetostrictive waveform is distorted greatly. In a range in which the area ratio of the closure domain formation region is high, the influence of this waveform distortion exceeds the shrinkage amount reduction effect by the introduction of closure domains, as a result of which the noise increases.

These results indicate that the transformer noise can be reduced by forming two regions different in magnetostrictive property, i.e. the closure domain formation region and the closure domain non-formation region, in the grain-oriented electrical steel sheet and appropriately controlling the area ratio of the closure domain formation region.

<Experiment 2>

Next, how the magnetostrictive waveform in the closure domain formation region influences the transformer noise was studied. As a result of examining various parameters, it was found that the transformer noise can be effectively reduced by limiting the shrinkage amount at the maximum displacement point of the magnetostrictive waveform at 1.7 T and 50 Hz to a specific range. This experiment will be described below.

Figure 4:
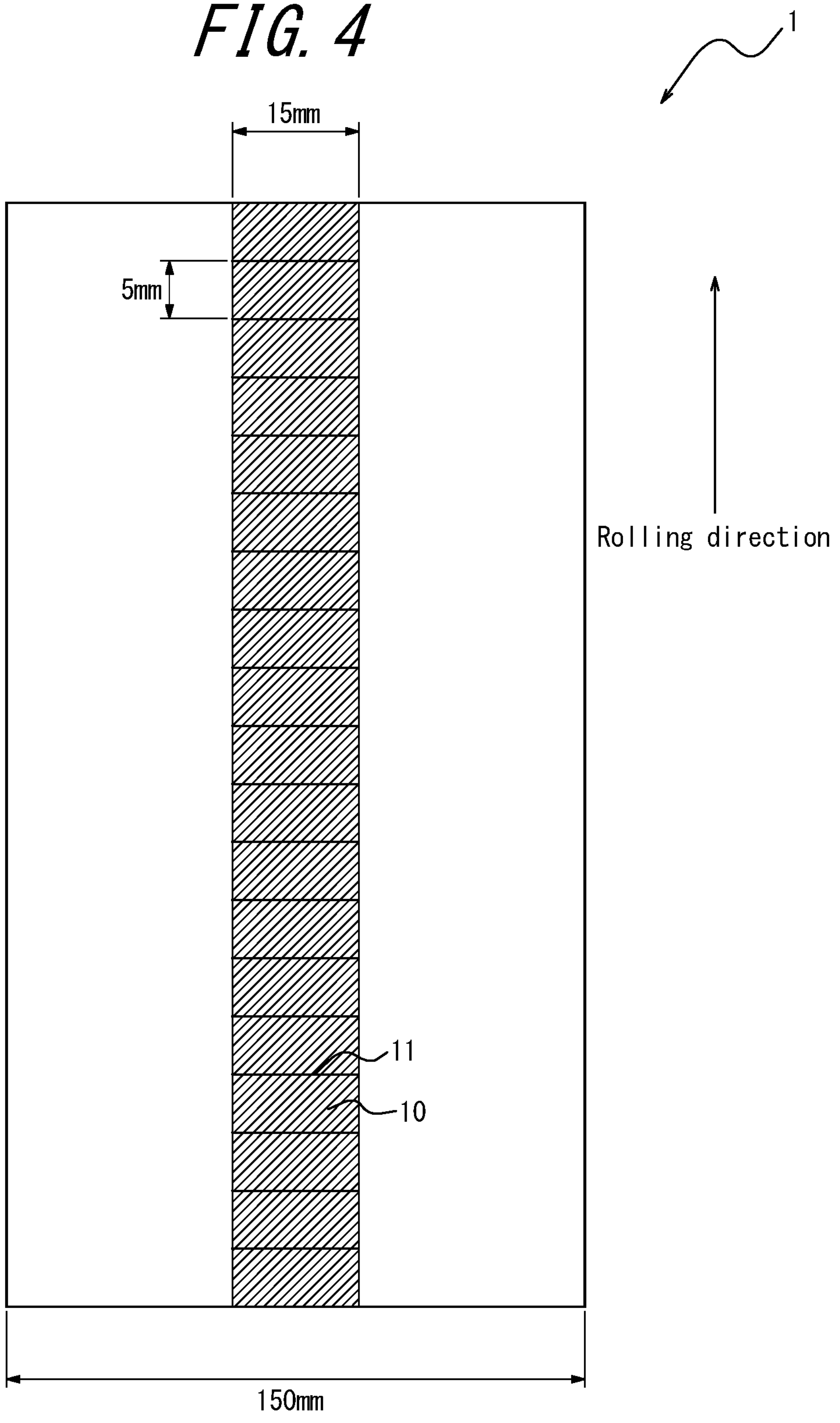
FIG. 4 is a schematic diagram of a grain-oriented electrical steel sheet as iron core material used in Experiment 2.

FIG. 4 schematically illustrates a grain-oriented electrical steel sheet 1 used as iron core material and arrangement of closure domains provided in the grain-oriented electrical steel sheet. A closure domain formation region 10 extending from one end to the other end in the rolling direction of the grain-oriented electrical steel sheet 1 was formed in a central part of the grain-oriented electrical steel sheet 1 in the width direction (direction orthogonal to the rolling direction). The region other than the closure domain formation region 10 is a region (closure domain non-formation region) 20 having no closure domains formed therein.

The grain-oriented electrical steel sheet 1 as iron core material for a transformer was produced by the following procedure. First, a typical grain-oriented electrical steel sheet having a thickness of 0.23 mm and not subjected to magnetic domain refining treatment was slit so as to have a width of 150 mm in the direction orthogonal to the rolling direction, and then subjected to a beveling work. When shearing the grain-oriented electrical steel sheet to have bevel edges, the steel sheet surface was irradiated with a laser on the shearing line entry side, to form the closure domain formation region 10. The laser was applied while being linearly scanned in the direction orthogonal to the rolling direction, as illustrated in FIG. 4. The laser irradiation was performed at an interval (irradiation line interval) of 5 mm in the rolling direction. As a result of the laser irradiation, linear strain 11 was formed at each position irradiated with the laser. By varying the laser power in a range of 100 W to 250 W, a plurality of grain-oriented electrical steel sheets different in shrinkage amount in the closure domain formation region were produced.

The other laser irradiation conditions were as follows:

laser: single mode fiber laser deflection rate: 5 m/sec power: 100 W to 250 W (see Table 1).

Linearly extending closure domains were formed in the closure domain formation region 10. The angle of the closure domains with respect to the rolling direction was 90°, and the interval between the closure domains in the rolling direction was 5 mm.

Samples were then collected from the closure domain formation region and the closure domain non-formation region of each obtained grain-oriented electrical steel sheet, and the shrinkage amount in the rolling direction when excited under the conditions of a frequency of 50 Hz and a magnetic flux density of 1.7 T was measured using a laser Doppler vibrometer. As representative examples, the shrinkage amount measurement results in three grain-oriented electrical steel sheets are illustrated in FIG. 5 and listed in Table 1.

TABLE 1

| No. | Power (W) | Shrinkage amount at maximum displacement point ($10^{-7}$): Closure domain non-formation region | Shrinkage amount at maximum displacement point ($10^{-7}$): Closure domain formation region | Difference in shrinkage amount ($10^{-7}$) |
|---|---|---|---|---|
| 1 | 100 | 5 | 4 | 1 |
| 2 | 180 | 5 | −2 | 7 |
| 3 | 250 | 5 | −3 | 8 |

Figure 5:
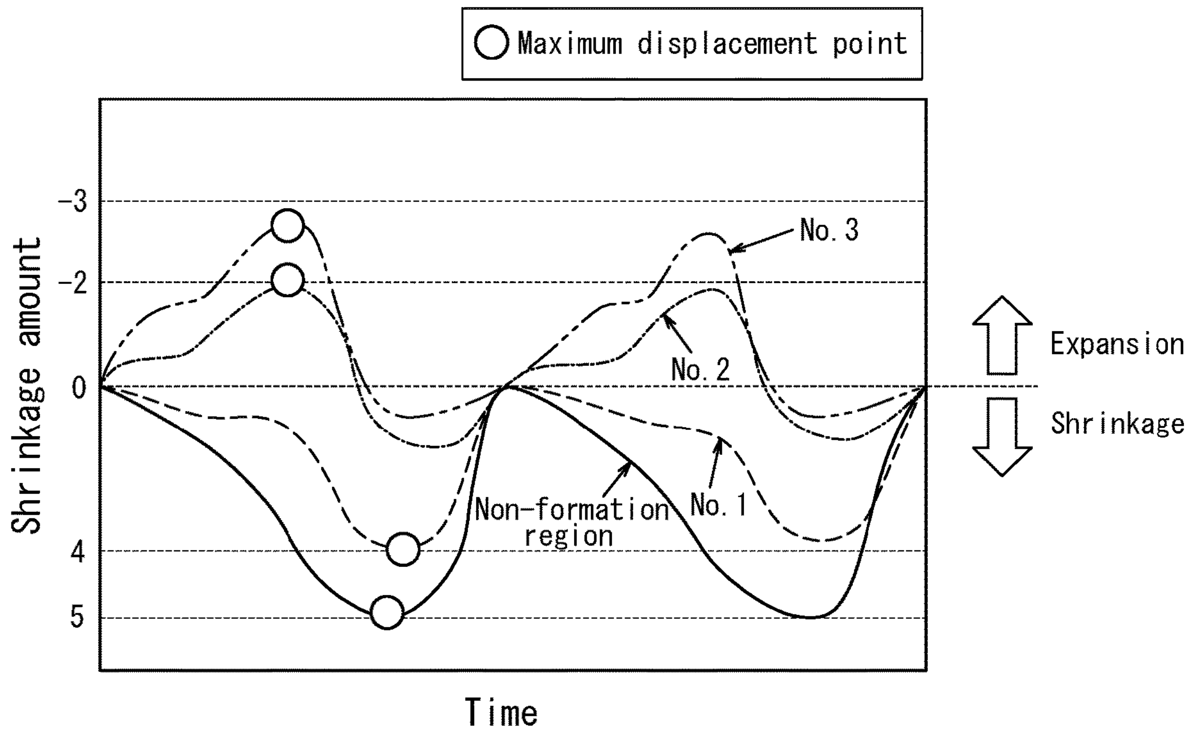
FIG. 5 is a graph illustrating expansion and shrinkage behavior when the grain-oriented electrical steel sheet is excited under the conditions of a maximum magnetic flux density of 1.7 T and a frequency of 50 Hz in Experiment 2.

FIG. 5 is a graph illustrating the expansion and shrinkage behavior of each sample when excited under the conditions of a frequency of 50 Hz and a maximum magnetic flux density of 1.7 T. The curves No. 1 to 3 each indicate the expansion and shrinkage behavior of the sample collected from the closure domain formation region. The solid line curve indicates the expansion and shrinkage behavior of the sample collected from the closure domain non-formation region, which was common to the three grain-oriented electrical steel sheets.

Consider the expansion and shrinkage amount at the point of maximum displacement (maximum displacement point) in the measured expansion and shrinkage behavior (hereafter referred to as "expansion and shrinkage amount"). The shrinkage amount in each sample is listed in Table 1. The "difference in shrinkage amount" $\Delta\lambda=\lambda_0-\lambda_1$), which is defined as the difference between the shrinkage amount ($\lambda_0$) in the closure domain non-formation region and the shrinkage amount ($\lambda_1$) in the closure domain formation region, is also listed in Table 1. Each shrinkage amount value that is minus indicates the expansion amount.

The results in Table 1 and FIG. 5 revealed that, in the closure domain formation region, the shrinkage amount at the maximum displacement point decreases with an increase in laser power, i.e. an increase in introduced strain amount.

Further, the obtained grain-oriented electrical steel sheets 1 were stacked to form an iron core, and the iron core was used to produce a transformer with a rated capacity of 1200 kVA. For each obtained transformer, noise when excited under the conditions of a maximum magnetic flux density of 1.7 T and a frequency of 50 Hz was evaluated.

Figure 6:
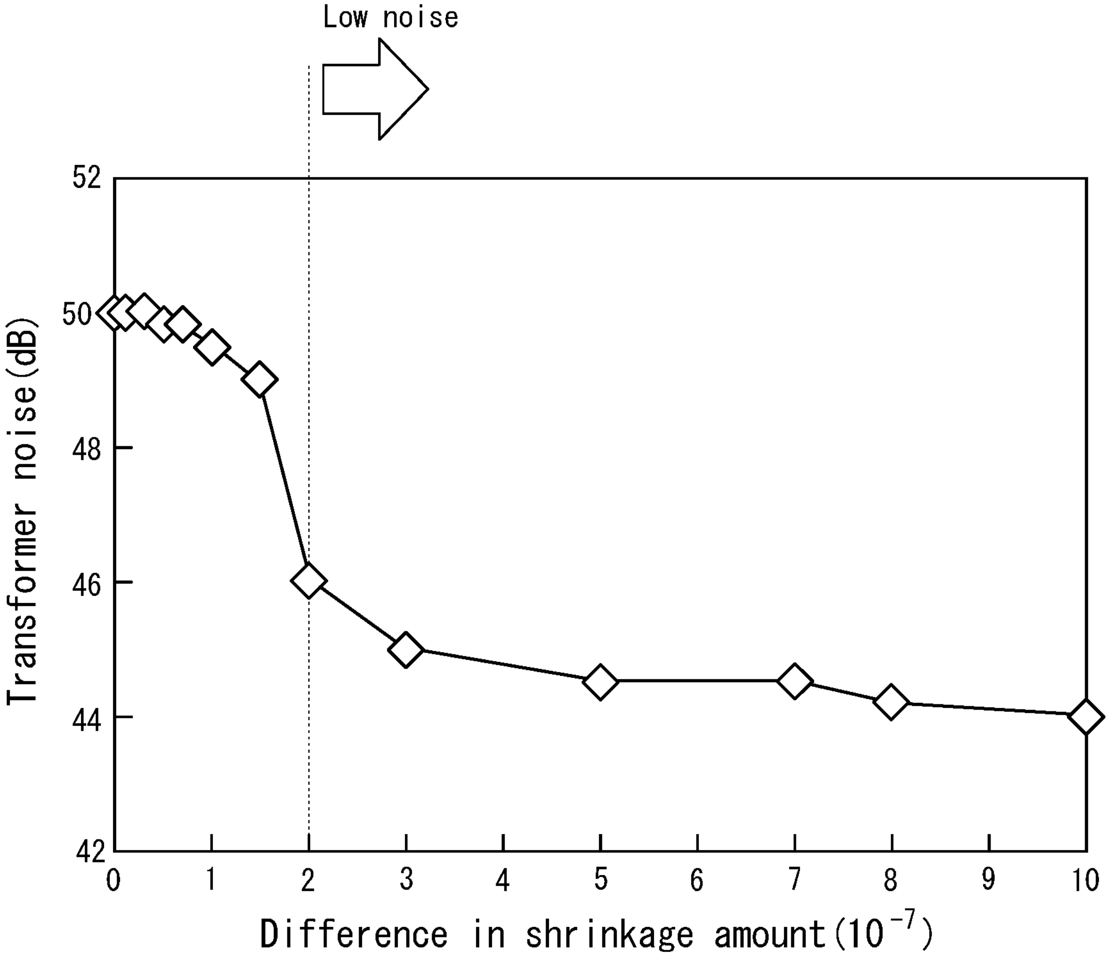
FIG. 6 is a graph illustrating the relationship between the difference in shrinkage amount and the transformer noise (dB) in Experiment 2.

FIG. 6 is a graph illustrating the relationship between the difference in shrinkage amount (z) at the maximum displacement point and the transformer noise. As can be understood from the results in FIG. 6, if $\Delta\lambda$, is $2\times10^{-7}$ or more, the transformer noise can be reduced effectively.

<Experiment 3>

Next, how the area ratio of the closure domain formation region influences the transformer noise was studied.

Figure 7:
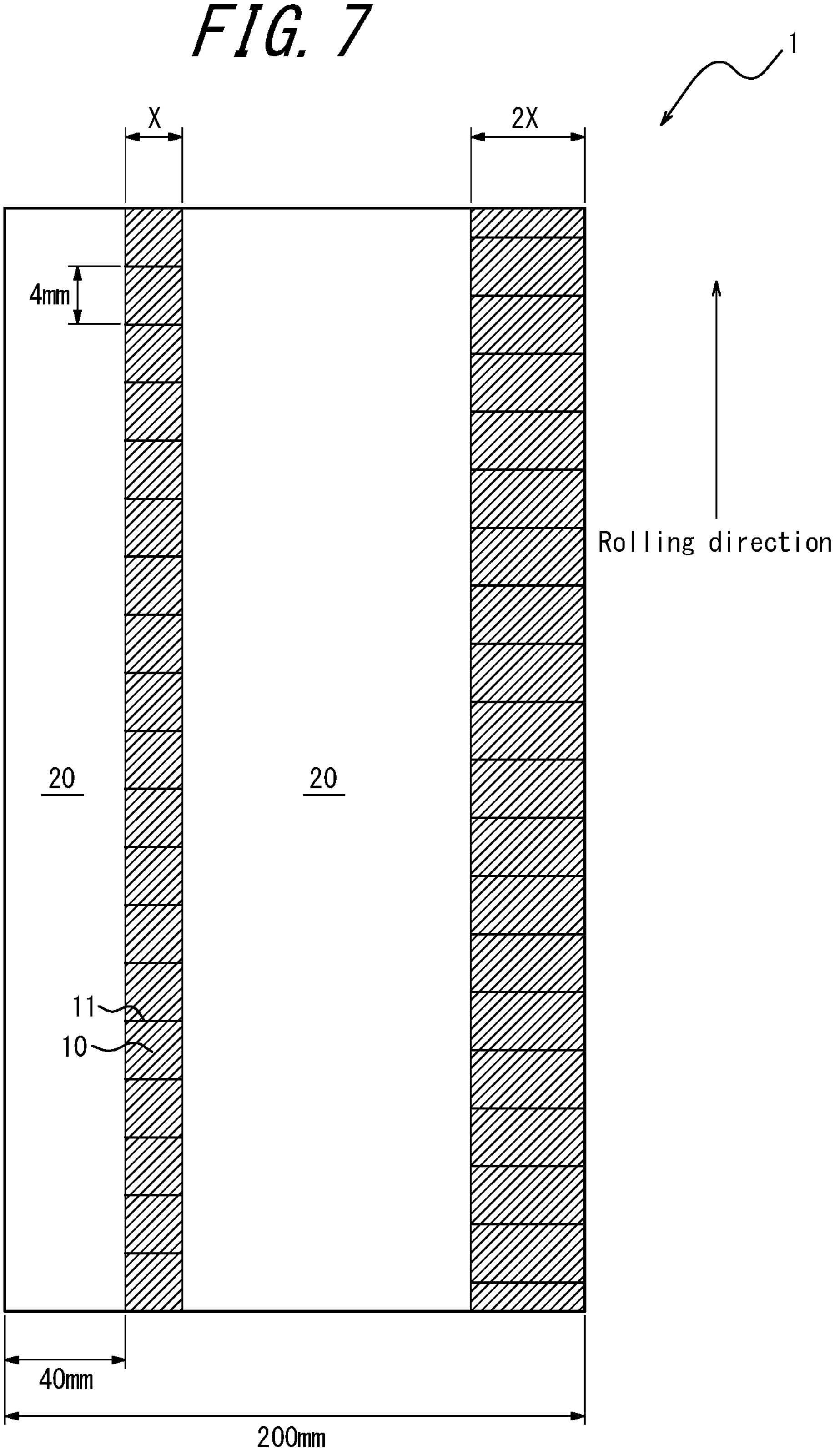
FIG. 7 is a schematic diagram of a grain-oriented electrical steel sheet as iron core material used in Experiment 3.

FIG. 7 schematically illustrates a grain-oriented electrical steel sheet 1 used as iron core material and arrangement of closure domains provided in the grain-oriented electrical steel sheet 1. Two closure domain formation regions 10 extending from one end to the other end in the rolling direction of the grain-oriented electrical steel sheet 1 were formed in the grain-oriented electrical steel sheet 1. The width of one closure domain formation region in the direction orthogonal to the rolling direction was X, and the width of the other closure domain formation region in the direction orthogonal to the rolling direction was 2×. By varying the value of X, grain-oriented electrical steel sheets different in the area ratio of the closure domain formation region (i.e. the two closure domain formation regions) in a range of 0% to 100% were produced. The regions other than the closure domain formation regions 10 were regions (closure domain non-formation regions) 20 having no closure domains formed therein. An area ratio of 0% indicates that only the closure domain non-formation region was present and no closure domain formation region was present. An area ratio of 100% indicates that only the closure domain formation region was present and no closure domain non-formation region was present.

The grain-oriented electrical steel sheet 1 as iron core material for a transformer was produced by the following procedure. First, a typical grain-oriented electrical steel sheet having a thickness of 0.30 mm and not subjected to magnetic domain refining treatment was slit so as to have a width of 200 mm in the direction orthogonal to the rolling direction, and then subjected to a beveling work. When shearing the grain-oriented electrical steel sheet to have bevel edges, the steel sheet surface was irradiated with an electron beam on the shearing line entry side, to form the closure domain formation region 10. The electron beam was applied while being linearly scanned in the direction orthogonal to the rolling direction, as illustrated in FIG. 7. The electron beam irradiation was performed at an interval (irradiation line interval) of 4 mm in the rolling direction. As a result of the electron beam irradiation, linear strain 11 was formed at each position irradiated with the electron beam.

The beam current was set to 2 mA or 15 mA, based on preliminary investigation results. In detail, if the difference in shrinkage amount is $2\times10^{-7}$ or more, the transformer noise can be reduced effectively, as demonstrated in Experiment 2. The minimum beam current required to satisfy the condition of the difference in shrinkage amount is 2 mA. When the beam current increases, the difference in shrinkage amount further increases. Excessively increasing the beam current, however, causes the steel sheet to deform due to irradiation, as a result of which the steel sheet may become unusable as iron core material. The upper limit of the beam current with which a steel sheet shape applicable as iron core material can be maintained is 15 mA. Hence, the difference in shrinkage amount in the obtained grain-oriented electrical steel sheet is $2\times10^{-7}$ or more, regardless of which of the beam current values is used.

The other conditions relating to the electron beam irradiation were as follows:

accelerating voltage: 60 kV scan rate: 10 m/sec.

Linearly extending closure domains were formed in the closure domain formation region 10. The angle of the closure domains with respect to the rolling direction was 90°, and the interval between the closure domains in the rolling direction was 4 mm.

The obtained grain-oriented electrical steel sheets 1 were stacked to form an iron core, and the iron core was used to produce a transformer of 2000 kVA. For each obtained transformer, noise when excited under the conditions of a frequency of 50 Hz and a magnetic flux density of 1.7 T was evaluated.

Figure 8:
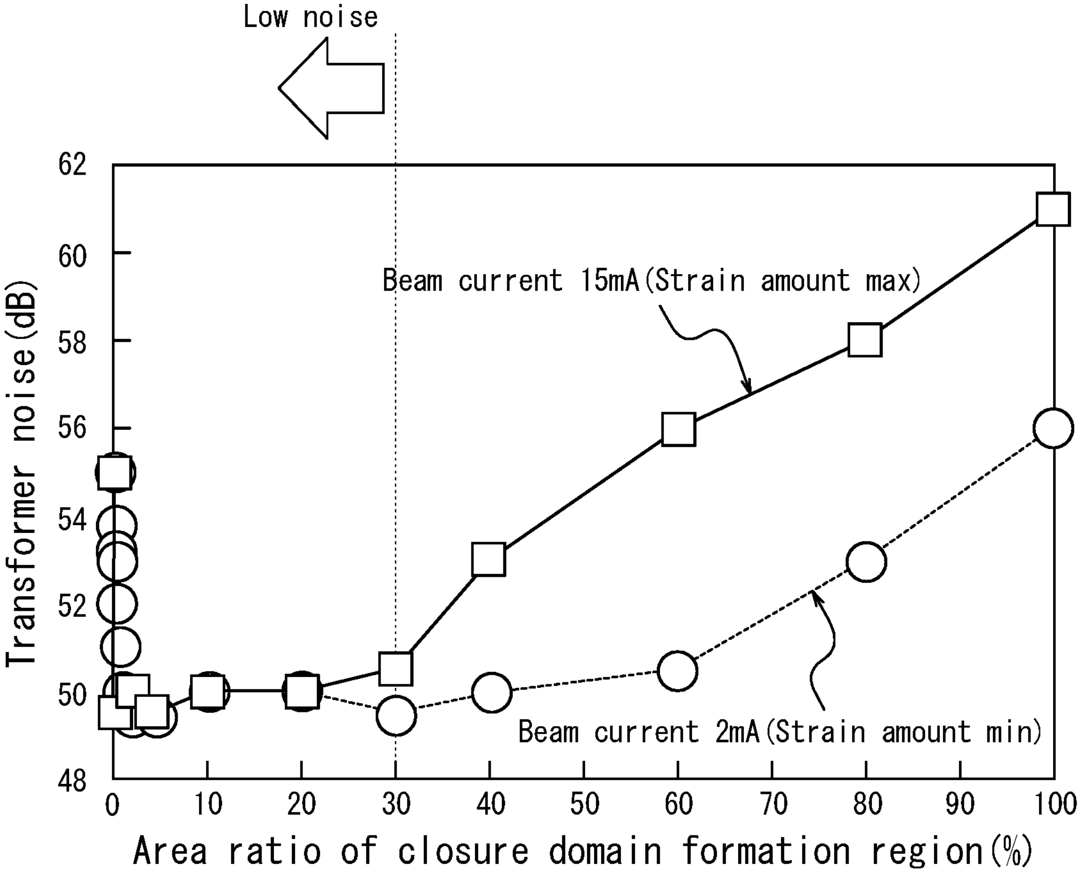
FIG. 8 is a graph illustrating the relationship between the area ratio (%) of a closure domain formation region in a range of 0% to 100% and the transformer noise (dB) in Experiment 3.
Figure 9:
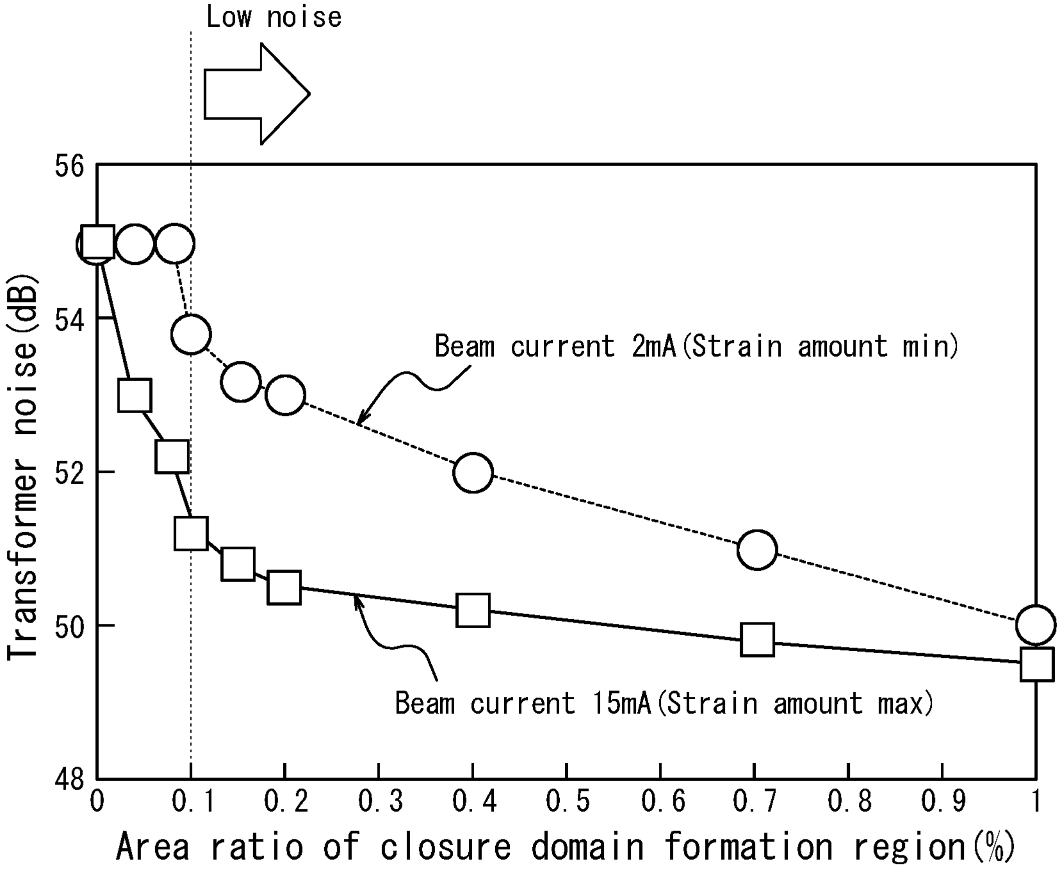
FIG. 9 is a graph illustrating the relationship between the area ratio (%) of the closure domain formation region in a range of 0% to 1% and the transformer noise (dB) in Experiment 3.

FIG. 8 is a graph illustrating the relationship between the area ratio (%) of the closure domain formation region in a range of 0% to 100% and the transformer noise (dB). FIG. 9 is a graph illustrating the relationship between the area ratio (%) of the closure domain formation region in a range of 0% to 1% and the transformer noise (dB). That is, FIG. 9 is a partial enlargement of FIG. 8. As can be understood from the results in FIGS. 8 and 9, in the case of forming the closure domain formation region so that the difference in shrinkage amount is $2\times10^{-7}$ or more, if the area ratio is 0.10% to 30%, the transformer noise can be reduced effectively regardless of the beam current, i.e. the strain introduction amount.

A method for carrying out the presently disclosed techniques will be described in detail below. The following description is to illustrate preferred embodiments of the present disclosure, and is not intended to limit the present disclosure.

[Iron Core for Transformer]

An iron core for a transformer according to one of the disclosed embodiments is an iron core for a transformer comprising a plurality of grain-oriented electrical steel sheets stacked together, wherein at least one of the grain-oriented electrical steel sheets satisfies the below-described conditions. The structure, etc. of the iron core for a transformer are not limited, and may be any structure, etc.

[Grain-Oriented Electrical Steel Sheet]

At least one of the grain-oriented electrical steel sheets as material of the iron core for a transformer needs to have a closure domain formation region and a closure domain non-formation region satisfying the below-described conditions. The closure domain formation region and the closure domain non-formation region differ in the magnetostrictive property of the steel sheet, as mentioned above. By using, as iron core material, such a grain-oriented electrical steel sheet that has parts different in the magnetostrictive property in one steel sheet, the expansion and shrinkage of the iron core can be suppressed and the transformer noise can be reduced. The other grain-oriented electrical steel sheets may be any grain-oriented electrical steel sheets.

As the grain-oriented electrical steel sheet, a grain-oriented electrical steel sheet worked in iron core size may be used. Even in the case where the grain-oriented electrical steel sheet (blank sheet) before working has the closure domain formation region and the closure domain non-formation region, the grain-oriented electrical steel sheet may end up having only one of the closure domain formation region and the closure domain non-formation region depending on from which part of the blank sheet the grain-oriented electrical steel sheet as iron core material is cut out. Hence, the grain-oriented electrical steel sheet as iron core material needs to be produced so as to satisfy the below-described conditions.

The thickness of the grain-oriented electrical steel sheet included in the iron core in the present disclosure is not limited, and may be any thickness. Even when the thickness of the steel sheet is changed, the closure domain disappearance amount and the auxiliary magnetic domain formation amount are unchanged. Thus, the noise reduction effect can be achieved regardless of the thickness. From the perspective of iron loss reduction, however, the thickness of the grain-oriented electrical steel sheet is desirably thin. The thickness of the grain-oriented electrical steel sheet is therefore preferably 0.35 mm or less. Meanwhile, if the grain-oriented electrical steel sheet has at least certain thickness, the grain-oriented electrical steel sheet is easy to handle, and the iron core manufacturability is improved. The thickness of the grain-oriented electrical steel sheet is therefore preferably 0.15 mm or more.

Closure Domain

The closure domains are formed in a direction crossing the rolling direction of the grain-oriented electrical steel sheet. In other words, the closure domains are provided to extend in a direction intersecting the rolling direction. Typically, the closure domains may be linear. The angle (inclination angle) of the closure domains with respect to the rolling direction is not limited, but is preferably 60° to 90°. Herein, the angle of the closure domains with respect to the rolling direction denotes the angle between the linearly extending closure domains and the rolling direction of the grain-oriented electrical steel sheet.

The closure domains are preferably provided at an interval in the rolling direction of the grain-oriented electrical steel sheet. The interval (line interval) between the closure domains in the rolling direction is not limited, but is preferably 3 mm to 15 mm. Herein, the interval between the closure domains denotes the interval between one closure domain and a closure domain adjacent to the closure domain. The interval between the closure domains may vary, but is preferably an equal interval.

One grain-oriented electrical steel sheet may include one or more closure domain formation regions. In the case where a plurality of closure domain formation regions are provided in one grain-oriented electrical steel sheet, the inclination angle and the line interval in each closure domain formation region may be the same or different. In the case of using a plurality of grain-oriented electrical steel sheets each having a closure domain formation region, the inclination angle and the line interval in the closure domain formation region in each grain-oriented electrical steel sheet may be the same or different.

In the present disclosure, the "region in which closure domains are formed" denotes a region in which a plurality of closure domains extending in a direction crossing the rolling direction are present at an interval in the rolling direction. For example, in the case where closure domains are successively formed at an interval from one end to the other end in the rolling direction of the grain-oriented electrical steel sheet 1 as illustrated in FIG. 2, the strip-shaped region (shaded part) in which the group of closure domains is formed is the "region in which closure domains are formed". In this description, the term "closure domain formation region" has the same meaning as the "region in which closure domains are formed".

Area ratio R: 0.10% to 30%

At least one of the grain-oriented electrical steel sheets used in the present disclosure needs to have the closure domain formation region and the closure domain non-formation region as described above, and also the area ratio R of the region in which the shrinkage amount is at least $2\times10^{-7}$ less than the shrinkage amount in the closure domain non-formation region to the whole grain-oriented electrical steel sheet needs to be 0.10% to 30%. In other words, the area ratio R of the closure domain formation region in which the "difference in shrinkage amount" ($\Delta\lambda=\lambda_0-\lambda_1$) defined as the difference between the shrinkage amount ($\lambda_0$) in the closure domain non-formation region and the shrinkage amount ($\lambda_1$) in the closure domain formation region is $2\times10^{-7}$ or more to the whole grain-oriented electrical steel sheet is 0.10% to 30%. Herein, the shrinkage amount denotes the shrinkage amount at the maximum displacement point when excited in the rolling direction at a maximum magnetic flux density of 1.7 T and a frequency of 50 Hz.

As mentioned earlier, when a grain-oriented electrical steel sheet is excited, auxiliary magnetic domains expanding in the thickness direction form, and consequently the grain-oriented electrical steel sheet shrinks in the rolling direction. On the other hand, closure domains expand in the direction orthogonal to the rolling direction, and the steel sheet shrinks in the rolling direction due to the presence of the closure domains. Accordingly, in a process in which closure domains disappear as a result of excitation, the steel sheet expands in the rolling direction. As a result of this expansion of closure domains canceling out the shrinkage by the formation of auxiliary magnetic domains, the shrinkage of the grain-oriented electrical steel sheet in the rolling direction can be reduced effectively.

To achieve this noise suppression effect, the area ratio R needs to be 0.10% or more. To further enhance the effect, the area ratio R is preferably 1.0% or more. Since strain is introduced in order to reduce the shrinkage amount, if the area ratio R is excessively high, noise caused by waveform distortion increases. The area ratio R is therefore 30% or less. The area ratio R is preferably 20% or less, and more preferably 15% or less.

Difference in shrinkage amount: $2\times10^{-7}$ or more

The area ratio R is defined as the area ratio of the region in which the difference in shrinkage amount is $2\times10^{-7}$ or more. If the difference in shrinkage amount is less than $2\times10^{-7}$, the foregoing vibration suppression effect is low, and the transformer noise cannot be reduced sufficiently. No upper limit is placed on the difference in shrinkage amount. However, an excessively large difference means that the absolute value of the magnetostriction of at least one of the regions is large, which may cause an increase of noise. Moreover, under the conditions in which the difference in shrinkage amount is large, the steel sheet may deform and become unusable as iron core material. The difference in shrinkage amount is therefore preferably $5\times10^{-6}$ or less. Thus, in one of the disclosed embodiments, the area ratio R of the closure domain formation region in which the "difference in shrinkage amount" ($\Delta\lambda=\lambda_0-\lambda_1$) defined as the difference between the shrinkage amount ($\lambda_0$) in the closure domain non-formation region and the shrinkage amount ($\lambda_1$) in the closure domain formation region is $2\times10^{-7}$ or more and $5\times10^{-6}$ or less to the whole grain-oriented electrical steel sheet is preferably 0.10% to 30%.

Preferably, in 50% or more of the region in which closure domains are formed, the shrinkage amount is at least $2\times10^{-7}$ less than in the region in which no closure domains are formed. In other words, the area ratio of the region in which the shrinkage amount is at least $2\times10^{-7}$ less than the shrinkage amount in the closure domain non-formation region to the whole closure domain formation region is preferably 50% or more. If the area ratio is 50% or more, the proportion of the region that is likely to have reciprocal influence of magnetostrictive property is high, so that higher magnetostrictive vibration suppression effect can be achieved. The area ratio is more preferably 75% or more.

At least one of the grain-oriented electrical steel sheets constituting the iron core for a transformer needs to satisfy the foregoing conditions. If the proportion of the grain-oriented electrical steel sheets satisfying the foregoing conditions to all grain-oriented electrical steel sheets is higher, the expansion and shrinkage of the whole iron core can be further reduced, and higher noise reduction effect can be achieved. Hence, the proportion is preferably 50% or more, and more preferably 75% or more. Herein, the proportion is defined as the proportion of the mass of the grain-oriented electrical steel sheets satisfying the conditions according to the present disclosure to the total mass of all grain-oriented electrical steel sheets constituting the iron core for a transformer.

The reason why the change in magnetostriction is defined based on the shrinkage amount "when excited at a maximum magnetic flux density of 1.7 T and a frequency of 50 Hz" in the present disclosure is because transformers using grain-oriented electrical steel sheets are often used at a magnetic flux density of about 1.7 T. At a lower magnetic flux density, noise is less problematic. Moreover, under the foregoing excitation conditions, the features of magnetostriction due to the crystal orientation and the magnetic domain structure of the electrical steel sheet appear markedly. The shrinkage amount under the conditions is therefore effective as an index representing the magnetostrictive property.

While the closure domain disappearance amount and the auxiliary magnetic domain formation amount vary in absolute value depending on the excitation magnetic flux density and the excitation frequency, their relative proportion is unchanged. That is, when the closure domain disappearance amount is small, the auxiliary magnetic domain formation amount is small. The expansion and shrinkage suppression effect can thus be achieved regardless of the excitation magnetic flux density. Hence, the use conditions of the iron core for a transformer according to the present disclosure are not limited to 1.7 T and 50 Hz, and may be any conditions.

When closure domains are formed, iron loss is reduced by the magnetic domain refining effect. Accordingly, in the case where closure domains are formed so as to satisfy the conditions according to the present disclosure, the closure domains serve to reduce iron loss. Therefore, the present disclosure is not limited from the perspective of iron loss reduction, too.

[Method of Forming Closure Domains]

The method of forming the closure domains is not limited, and may be any method. An example of the method of forming the closure domains is a method of introducing strain at the positions where the closure domains are to be formed. Examples of the strain introduction method include shot blasting, water jet, laser, electron beam, and plasma flame. By introducing linear strain in a direction crossing the rolling direction, the closure domains can be formed in the direction crossing the rolling direction.

The timing of the formation of the closure domains is not limited, and may be any timing. For example, the closure domains may be formed before or after slitting the grain-oriented electrical steel sheet. In the case of forming the closure domains before the slitting, it is necessary to select a slit coil and adjust the slit position so that the area ratio R satisfies the foregoing condition. From the perspective of the yield rate, it is preferable to form the closure domains after the slitting.

The magnetostrictive property can also be changed by changing the crystal orientation or the film tension to control the auxiliary magnetic domain formation state. However, partially controlling the crystal orientation or the film tension is very difficult, and is not feasible at industrial level. The iron core for a transformer according to the present disclosure can be produced by a very simple method of forming closure domains, and thus is superior in terms of productivity, too.

The closure domain formation region need not necessarily extend from one end to the other end in the rolling direction as illustrated in FIG. 2. The shape of the closure domain formation region is not limited to a rectangle, and may be any shape.

The arrangement of the closure domain formation region in the plane of the grain-oriented electrical steel sheet is not limited, and may be any arrangement. From the perspective of suppressing expansion and shrinkage more effectively, the closure domain formation region and the closure domain non-formation region are preferably adjacent in the direction orthogonal to the rolling direction. In other words, it is preferable that the boundary between the closure domain formation region and the closure domain non-formation region adjacent to the closure domain formation region has a component in the rolling direction.

EXAMPLES

Figure 10:
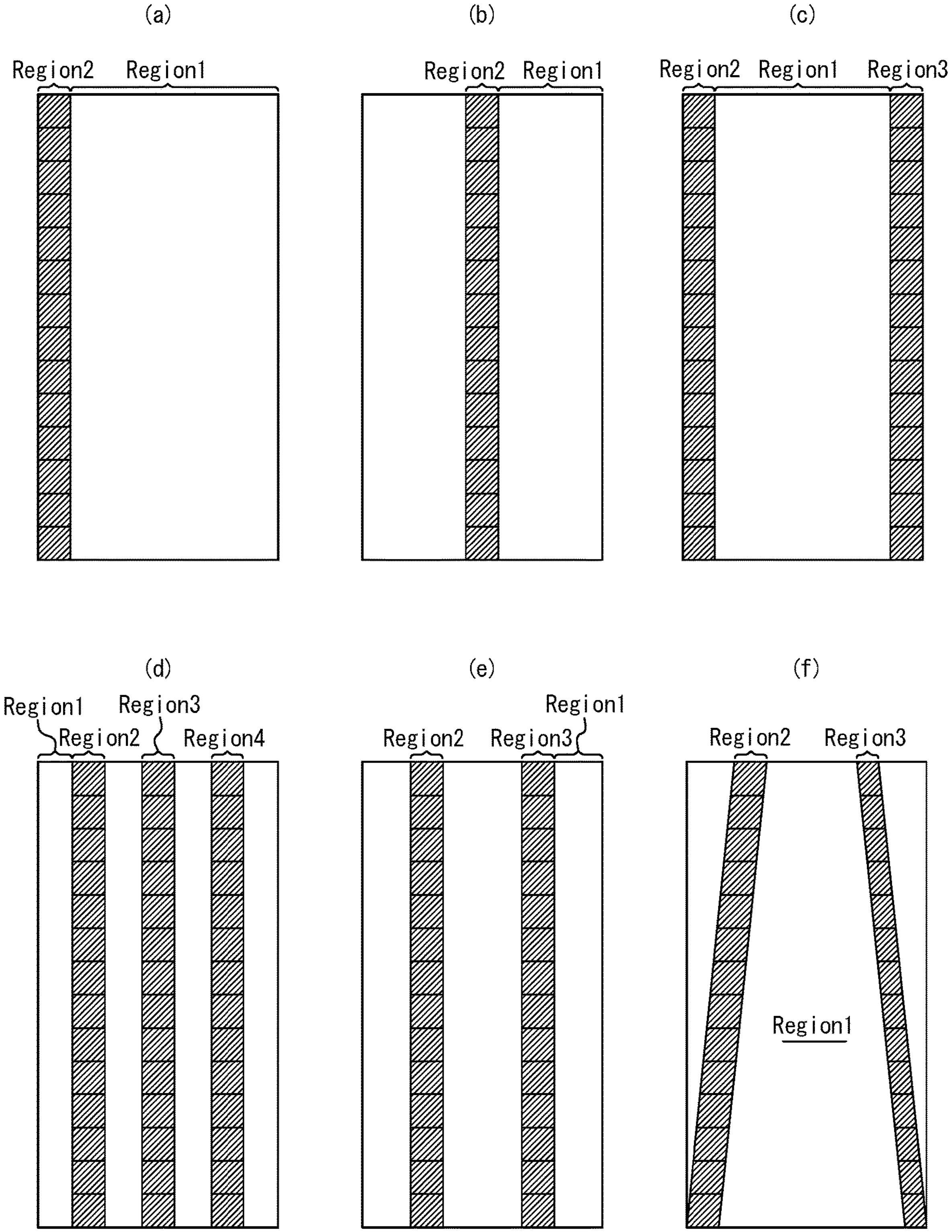
FIG. 10 is a schematic diagram illustrating patterns of closure domain formation regions in a grain-oriented electrical steel sheet used in examples.

Three types of grain-oriented electrical steel sheets of 160 mm in width and 0.23 mm, 0.27 mm, and 0.30 mm in thickness were prepared, and each grain-oriented electrical steel sheet was irradiated with an electron beam to form closure domains. The arrangement of the region in which the closure domain were formed was selected from six patterns (a) to (f) illustrated in FIG. 10. The patterns (a) and (b) are patterns in which one closure domain formation region is present in one grain-oriented electrical steel sheet. The patterns (c), (e), and (f) are patterns in which two closure domain formation regions are present in one grain-oriented electrical steel sheet. The pattern (d) is a pattern in which three closure domain formation regions are present in one grain-oriented electrical steel sheet. In each pattern, the part(s) other than the closure domain formation region(s) is a closure domain non-formation region.

The pattern used, the area ratio of each closure domain formation region, and the beam current when forming each closure domain formation region are listed in Tables 2 to 4. Herein, the area ratio of each closure domain formation region is the ratio (%) of the area of the closure domain formation region to the area of the grain-oriented electrical steel sheet.

The other electron beam irradiation conditions were as follows:

accelerating voltage: 60 kV scan rate: 32 m/sec irradiation line interval: 5 mm.

The closure domain introduction amount (volume) can be adjusted by changing conditions such as accelerating voltage, beam current, scan rate, and formation interval. In this example, the closure domain introduction amount was adjusted by changing the beam current. Since the shrinkage behavior of the steel sheet depends on the closure domain introduction amount, even when the parameter adjusted is different, the influence on the shrinkage behavior is the same as long as the volume of the introduced closure domains is the same. For comparison, electron beam irradiation was not performed in some examples (No. 1, 11, and 20).

Next, whether closure domains were actually formed in each region irradiated with an electron beam was determined through closure domain observation by the Bitter method using a magnetic viewer (MV-95 made by Sigma Hi-Chemical, Inc.). The determination results are listed in Tables 2 to 4. The reason why closure domains were not formed despite application of a beam current in some examples is because the beam current was low.

Next, the magnetostrictive property in each region was evaluated, and the difference in shrinkage amount defined as the difference between the shrinkage amount in the closure domain non-formation region and the shrinkage amount in each region was calculated. The magnetostrictive property in each region was evaluated using a sample obtained by irradiating the whole surface of a grain-oriented electrical steel sheet cut to a width of 100 mm and a length of 500 mm with an electron beam under the same conditions as in each experiment. As the grain-oriented electrical steel sheet for producing the sample, the same grain-oriented electrical steel sheet as in each experiment was used. The magnetostriction (steel sheet expansion and shrinkage) when exciting the sample by alternating current at a maximum magnetic flux density of 1.7 T and a frequency of 50 Hz was measured using a laser Doppler vibrometer. The calculated difference in shrinkage amount is listed in Tables 2 to 4.

For the obtained grain-oriented electrical steel sheet, the area ratio R of the region in which the shrinkage amount at the maximum displacement point when excited in the rolling direction at a maximum magnetic flux density of 1.7 T and a frequency of 50 Hz was at least $2\times10^{-7}$ less than the shrinkage amount at the maximum displacement point when excited in the rolling direction at a maximum magnetic flux density of 1.7 T and a frequency of 50 Hz in the region having no closure domains formed therein to the whole grain-oriented electrical steel sheet is listed in Tables 2 to 4.

The obtained grain-oriented electrical steel sheet was then used to produce an iron core for a transformer. The iron core for a transformer was an iron core of stacked three-phase tripod type, and was produced by shearing a coil of the grain-oriented electrical steel sheet with a width of 160 mm to have bevel edges and stacking them. The dimensions of the whole iron core were as follows: width: 890 mm, height: 800 mm, and stacked thickness: 244 mm.

The proportion (%) of one or more grain-oriented electrical steel sheets obtained by the foregoing procedure to the whole iron core is listed in Tables 2 to 4. Each iron core whose proportion was 100% was an iron core produced by stacking only grain-oriented electrical steel sheets irradiated with an electron beam by the foregoing procedure. Each iron core whose proportion was less than 100% was produced by stacking not only one or more grain-oriented electrical steel sheets irradiated with an electron beam but also one or more grain-oriented electrical steel sheets produced in the same way as the foregoing one or more grain-oriented electrical steel sheets except that they were not irradiated with an electron beam.

Next, after an excitation coil was wound around the obtained iron core, the iron core was excited under the conditions listed in Tables 5 to 7, and the noise under the different excitation conditions was measured. The excitation was performed by alternating current at 50 Hz or 60 Hz in frequency, with three different conditions of the maximum magnetic flux density, i.e. 1.3 T, 1.5 T, and 1.7 T.

The noise was measured in a total of six locations, that is, the front and the back of each of the three legs of the iron core. The measurement position was 400 mm in height and 300 mm from the surface of the iron core. The average value of the noise measured in the six locations is listed in Tables 5 to 7.

As can be understood from the results in Tables 5 to 7, in each iron core for a transformer satisfying the conditions according to the present disclosure, the noise was reduced as compared with Comparative Examples.

TABLE 2

| No. | Thickness (mm) | Pattern | Beam current (mA) Region 2 | Beam current (mA) Region 3 | Beam current (mA) Region 4 | Presence of closure domain Region 2 | Presence of closure domain Region 3 | Presence of closure domain Region 4 | Area ratio of each region (%) Region 2 | Area ratio of each region (%) Region 3 | Area ratio of each region (%) Region 4 | Difference in shrinkage amount ($10^{-7}$) Region 2 | Difference in shrinkage amount ($10^{-7}$) Region 3 | Difference in shrinkage amount ($10^{-7}$) Region 4 | Area ratio R (%) | Proportion to whole iron core (%) | Remarks |
|---|---|---|---|---|---|---|---|---|---|---|---|---|---|---|---|---|---|
| 1 | 0.23 | | | | | — | | | | | | | — | | | | Comparative Example |
| 2 | | a | 1 | — | — | Absent | — | — | 15 | — | — | 0.05 | — | — | 0 | 100 | Comparative Example |
| 3 | | | 6.5 | — | — | Present | — | — | 0.5 | — | — | 3 | — | — | 0.5 | 100 | Example |
| 4 | | | 6.5 | — | — | Present | — | — | 0.5 | — | — | 3 | — | — | 0.5 | 70 | Example |
| 5 | | | 15 | — | — | Present | — | — | 12 | — | | | | | | | |
| 6 | | | 15 | — | — | Present | — | — | 12 | — | | | | | | | |
| 7 | | | 15 | — | — | Present | — | — | 27 | — | | | | | | | |
| 8 | | b | 1.5 | — | — | Absent | — | — | 5 | — | | | | | | | |
| 9 | | | 8 | — | — | Present | — | — | 0.08 | — | | | | | | | |
| 10 | | | 8 | — | — | Present | — | — | 10 | — | | | | | | | |

TABLE 2-continued

| | | | | | | | |
|---|---|---|---|---|---|---|---|
| 5 | — | 22 | — | — | 12 | 100 | Example |
| 6 | — | 22 | — | — | 12 | 85 | Example |
| 7 | — | 22 | — | — | 27 | 100 | Example |
| 8 | — | 0.1 | — | — | 0 | 100 | Comparative Example |
| 9 | — | 10 | — | — | 0.08 | 100 | Comparative Example |
| 10 | — | 10 | — | — | 10 | 100 | Example |

TABLE 3

| No. | Thickness (mm) | Pattern | Beam current (mA) Region 2 | Beam current (mA) Region 3 | Beam current (mA) Region 4 | Presence of closure domain Region 2 | Presence of closure domain Region 3 | Presence of closure domain Region 4 | Area ratio of each region (%) Region 2 | Area ratio of each region (%) Region 3 |
|---|---|---|---|---|---|---|---|---|---|---|
| 11 | 0.2 | | | | | — | | | | |
| 12 | | c | 0.5 | 10 | — | Absent | Present | — | 5 | 5 |
| 13 | | | 0.5 | 10 | — | Absent | Present | — | 5 | 5 |
| 14 | | | 5 | 10 | — | Present | Present | — | 3 | 7 |
| 15 | | | 5 | 10 | — | Present | Present | — | 3 | 7 |
| 16 | | | 9 | 9 | — | Present | Present | — | 3 | 7 |
| 17 | | d | 8 | 6 | 8 | Present | Present | Present | 1 | 1 |
| 18 | | | 8 | 6 | 8 | Present | Present | Present | 20 | 5 |
| 19 | | | 11 | 11 | 11 | Present | Present | Present | 12 | 12 |

| No. | Area ratio of each region (%) Region 4 | Difference in shrinkage amount ($10^{-7}$) Region 2 | Difference in shrinkage amount ($10^{-7}$) Region 3 | Difference in shrinkage amount ($10^{-7}$) Region 4 | Area ratio R (%) | Proportion to whole iron core (%) | Remarks |
|---|---|---|---|---|---|---|---|
| 11 | | | — | | | | Comparative Example |
| 12 | — | 0.01 | 8 | — | 5 | 100 | Example |
| 13 | — | 0.01 | 8 | — | 5 | 30 | Example |
| 14 | — | 1.2 | 8 | — | 7 | 100 | Example |
| 15 | — | 1.2 | 8 | — | 7 | 15 | Example |
| 16 | — | 6 | 6 | — | 10 | 100 | Example |
| 17 | 1 | 5 | 2.2 | 5 | 3 | 100 | Example |
| 18 | 4 | 5 | 2.2 | 5 | 29 | 100 | Example |
| 19 | 12 | 12 | 12 | 12 | 36 | 100 | Comparative Example |

TABLE 4

| No. | Thickness (mm) | Pattern | Beam current (mA) Region 2 | Beam current (mA) Region 3 | Beam current (mA) Region 4 | Presence of closure domain Region 2 | Presence of closure domain Region 3 | Presence of closure domain Region 4 | Area ratio of each region (%) Region 2 | Area ratio of each region (%) Region 3 |
|---|---|---|---|---|---|---|---|---|---|---|
| 20 | 0.30 | | | | | — | | | | |
| 21 | | e | 8 | 9 | — | Present | Present | — | 2 | 0.4 |
| 22 | | | 0.6 | 9.5 | — | Present | Present | — | 3 | 0.05 |
| 23 | | | 10.5 | 0.6 | — | Present | Present | — | 3 | 0.3 |
| 24 | | f | 8 | 9 | — | Present | Present | — | 5 | 5 |
| 25 | | | 8 | 9 | — | Present | Present | — | 10 | 10 |
| 26 | | | 8 | 9 | — | Present | Present | — | 5 | 5 |
| 27 | | | 4 | 9.5 | — | Present | Present | — | 3 | 7 |
| 28 | | | 10.5 | 4 | — | Present | Present | — | 0.2 | 7 |

| No. | Area ratio of each region (%) Region 4 | Difference in shrinkage amount ($10^{-7}$) Region 2 | Difference in shrinkage amount ($10^{-7}$) Region 3 | Difference in shrinkage amount ($10^{-7}$) Region 4 | Area ratio R (%) | Proportion to whole iron core (%) | Remarks |
|---|---|---|---|---|---|---|---|
| 20 | | | — | | | | Comparative Example |
| 21 | — | 5 | 6 | — | 2.4 | 100 | Example |
| 22 | — | 0.02 | 7 | — | 0.05 | 100 | Comparative Example |
| 23 | — | 10 | 0.02 | — | 3 | 100 | Example |
| 24 | — | 5 | 6 | — | 10 | 100 | Example |
| 25 | — | 5 | 6 | — | 20 | 100 | Example |

TABLE 4-continued

| | | | | | | | |
|---|---|---|---|---|---|---|---|
| 26 | — | 5 | 6 | — | 10 | 60 | Example |
| 27 | — | 0.9 | 7 | — | 7 | 100 | Example |
| 28 | — | 10 | 0.9 | — | 0.2 | 100 | Example |

TABLE 5

| | Noise (dB) | | | | | | |
|---|---|---|---|---|---|---|---|
| | 50 Hz | | | 60 Hz | | | |
| No. | 1.3 T | 1.5 T | 1.7 T | 1.3 T | 1.5 T | 1.7 T | Remarks |
| 1 | 50.0 | 55.0 | 60.0 | 53.0 | 59.0 | 65.0 | Comparative Example |
| 2 | 50.0 | 55.0 | 60.0 | 53.0 | 59.0 | 65.0 | Comparative Example |
| 3 | 46.0 | 51.0 | 56.0 | 49.0 | 55.0 | 61.0 | Example |
| 4 | 47.0 | 52.0 | 57.0 | 50.0 | 56.0 | 62.0 | Example |
| 5 | 45.0 | 50.0 | 55.0 | 48.0 | 54.0 | 60.0 | Example |
| 6 | 46.0 | 51.0 | 56.0 | 49.0 | 55.0 | 61.0 | Example |
| 7 | 48.5 | 53.5 | 58.5 | 51.5 | 57.5 | 63.5 | Example |
| 8 | 50.0 | 55.0 | 60.0 | 53.0 | 59.0 | 65.0 | Comparative Example |
| 9 | 50.0 | 55.0 | 60.0 | 53.0 | 59.0 | 65.0 | Comparative Example |
| 10 | 43.0 | 48.0 | 53.0 | 46.0 | 52.0 | 58.0 | Example |

TABLE 6

| | Noise (dB) | | | | | | |
|---|---|---|---|---|---|---|---|
| | 50 Hz | | | 60 Hz | | | |
| No. | 1.3 T | 1.5 T | 1.7 T | 1.3 T | 1.5 T | 1.7 T | Remarks |
| 11 | 50.0 | 55.0 | 60.0 | 53.0 | 59.0 | 65.0 | Comparative Example |
| 12 | 45.0 | 50.0 | 55.0 | 48.0 | 54.0 | 60.0 | Example |
| 13 | 48.0 | 53.0 | 58.0 | 51.0 | 57.0 | 63.0 | Example |
| 14 | 45.0 | 50.0 | 55.0 | 48.0 | 54.0 | 60.0 | Example |
| 15 | 48.5 | 53.5 | 58.5 | 51.5 | 57.5 | 63.5 | Example |
| 16 | 44.0 | 49.0 | 54.0 | 47.0 | 53.0 | 59.0 | Example |
| 17 | 45.0 | 50.0 | 55.0 | 48.0 | 54.0 | 60.0 | Example |
| 18 | 48.5 | 53.5 | 58.5 | 51.5 | 57.5 | 63.5 | Example |
| 19 | 50.0 | 55.0 | 60.0 | 53.0 | 59.0 | 65.0 | Comparative Example |

TABLE 7

| | Noise (dB) | | | | | | |
|---|---|---|---|---|---|---|---|
| | 50 Hz | | | 60 Hz | | | |
| No. | 1.3 T | 1.5 T | 1.7 T | 1.3 T | 1.5 T | 1.7 T | Remarks |
| 20 | 50.0 | 55.0 | 60.0 | 53.0 | 59.0 | 65.0 | Comparative Example |
| 21 | 45.0 | 50.0 | 55.0 | 48.0 | 54.0 | 60.0 | Example |
| 22 | 50.0 | 55.0 | 60.0 | 53.0 | 59.0 | 65.0 | Comparative Example |
| 23 | 45.0 | 50.0 | 55.0 | 48.0 | 54.0 | 60.0 | Example |
| 24 | 44.0 | 49.0 | 54.0 | 47.0 | 53.0 | 59.0 | Example |
| 25 | 47.0 | 52.0 | 57.0 | 50.5 | 56.5 | 62.5 | Example |
| 26 | 46.5 | 51.5 | 56.5 | 49.5 | 55.5 | 61.5 | Example |
| 27 | 44.5 | 49.5 | 54.5 | 47.5 | 53.5 | 59.5 | Example |
| 28 | 46.5 | 51.5 | 56.5 | 49.5 | 55.5 | 61.5 | Example |

REFERENCE SIGNS LIST

1 grain-oriented electrical steel sheet
10 closure domain formation region
11 linear strain
20 closure domain non-formation region

The invention claimed is:

1. An iron core for a transformer, comprising a plurality of grain-oriented electrical steel sheets stacked together, wherein at least one of the plurality of grain-oriented electrical steel sheets:

(1) has a closure domain formation region extending from one end of the grain-oriented electrical steel sheet to the other end in a rolling direction in which a plurality of closure domains extending in a direction crossing the rolling direction are present at an interval in the rolling direction, and a closure domain non-formation region in which no closure domains are formed; and (2) has an area ratio R of 0.10% to 30%, the area ratio R being an area ratio, to the whole grain-oriented electrical steel sheet, of the closure domain formation region, where a shrinkage amount of the grain-oriented electrical steel sheet at a maximum displacement point when excited in the rolling direction at a maximum magnetic flux density of 1.7 T and a frequency of 50 Hz is at least $2\times10^{-7}$ less than a shrinkage amount of the grain-oriented electrical steel sheet in the closure domain non-formation region, the maximum displacement point being defined as a point where an amount of expansion or shrinkage of the grain-oriented electrical steel sheet is maximum when excited under the maximum magnetic flux density and the frequency.

2. The iron core for a transformer according to claim 1, wherein an angle of the closure domains with respect to the rolling direction is 60° to 90°.

3. The iron core for a transformer according to claim 1, wherein the interval between the closure domains in the rolling direction is 3 mm to 15 mm.

4. The iron core for a transformer according to claim 2, wherein the interval between the closure domains in the rolling direction is 3 mm to 15 mm.

* * * * *